(12) United States Patent
Eklund et al.

(10) Patent No.: US 7,848,621 B2
(45) Date of Patent: Dec. 7, 2010

(54) FILE FORMAT TRANSLATION

(75) Inventors: Don Eklund, Yorba Linda, CA (US); Raja Sahi, Los Angeles, CA (US); Sumit Malik, Pasadena, CA (US); Tommy Choy, Lakewood, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 1193 days.

(21) Appl. No.: 11/428,215

(22) Filed: Jun. 30, 2006

(65) Prior Publication Data

US 2007/0002166 A1 Jan. 4, 2007

Related U.S. Application Data

(60) Provisional application No. 60/696,318, filed on Jul. 1, 2005.

(51) Int. Cl.
*H04N 5/00* (2006.01)
(52) U.S. Cl. .................. 386/125; 386/95; 348/386.1
(58) Field of Classification Search .............. 386/95, 386/125; 348/386.1
See application file for complete search history.

(56) References Cited

U.S. PATENT DOCUMENTS

| | | | |
|---|---|---|---|
| 3,088,996 A | 5/1963 | Carter | |
| 5,936,968 A * | 8/1999 | Lyons | ............... 370/503 |
| 6,404,711 B1 | 6/2002 | Kato | |
| 6,453,459 B1 | 9/2002 | Brodersen et al. | |
| 6,807,363 B1 | 10/2004 | Abiko et al. | |
| 2002/0112226 A1 | 8/2002 | Brodersen et al. | |
| 2002/0174438 A1 | 11/2002 | Cleary et al. | |
| 2003/0193520 A1 | 10/2003 | Detzel | |
| 2004/0146283 A1 * | 7/2004 | Seo et al. | ............... 386/95 |
| 2004/0167916 A1 * | 8/2004 | Basso et al. | ............... 707/100 |
| 2004/0210896 A1 | 10/2004 | Chou et al. | |
| 2004/0220791 A1 | 11/2004 | Lamkin et al. | |
| 2004/0240360 A1 | 12/2004 | Kim et al. | |
| 2005/0013593 A1 | 1/2005 | Jung et al. | |
| 2005/0069289 A1 * | 3/2005 | Kusunoki | ............... 386/52 |
| 2005/0114909 A1 | 5/2005 | Mercier | |
| 2005/0155058 A1 | 7/2005 | Jung et al. | |
| 2005/0185929 A1 | 8/2005 | Kang et al. | |
| 2006/0165388 A1 | 7/2006 | Uesaka et al. | |

OTHER PUBLICATIONS

International Search Report/Written Opinion issued in PC/US06/26058 on Jun. 27, 2008.
International Search Report/Written Opinion issued in PCT/US06/34191 on Jul. 14, 2008.
International Search Report/Written Opinion issued in PCT/US06/34190 on Jul. 8, 2008.

(Continued)

*Primary Examiner*—Thai Tran
*Assistant Examiner*—Girumsew Wendmagegn
(74) *Attorney, Agent, or Firm*—Procopio, Cory, Hargreaves & Savich LLP

(57) ABSTRACT

Providing data for a stream multiplexer without generating any additional elementary stream file, including: receiving elementary stream data; generating pointer information for the elementary stream data; and generating a modification script using the pointer information, wherein the modification script specifies a process for modifying the elementary stream data for the stream multiplexer.

32 Claims, 7 Drawing Sheets

OTHER PUBLICATIONS

International Search Report and Written Opinion issued in PCT/US2006/34306 on Aug. 29, 2007.
International Search Report and Written Opinion issued in PCT/US06/34307 on Oct. 18, 2007.
International Search Report and Written Opinion issued in PCT/US2006/34316 on Aug. 2, 2007.
International Search Report and Written Opinion issued in PCT/US2006/33915 on Apr. 12, 2007.
International Search Report and Written Opinion issued in PCT/US06/34309 on Apr. 9, 2007.

* cited by examiner

SOURCE ES
(e.g., HELLO.AC3)

```
110   TIMECODE
10    HEADER
100   A
110   TIMECODE
```

POINTER INFORMATION FILE
(e.g., HELLO.AC3.XUI)

```
HELLO.AC3
Delete   110
Delete   10
Keep     100
Delete   110
```

MODIFICATION SCRIPT
(e.g., HELLO.AC3.VES)

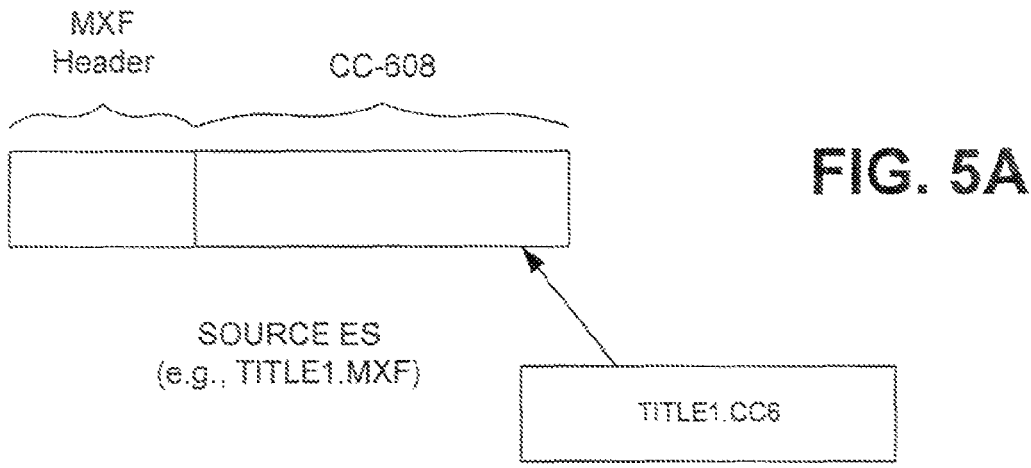
FIG. 5A
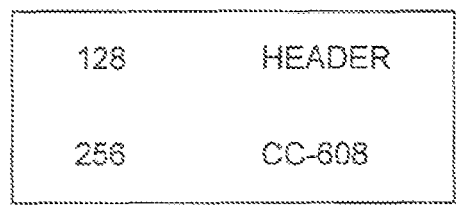
FIG. 5B
```
VIDEO1 = VIDEOSOURCE(TITLE1.MXF,M2V)
IF VIDEO1.LOCATE(MXF) ->
            VIDEO1.DELETE(MXF)
IF VIDEO1.LOCATE(CC608) ->
            VIDEO1.DELETE(CC608)
VIDEO1.INSERT(CC608,TITLE1.CC6)
OUTPUT = VIDEO1
```
MODIFICATION SCRIPT
(e.g., TITLE1.MXF.VES)
FIG. 5C

FILE FORMAT TRANSLATION

RELATED APPLICATION

This application claims the benefit of priority of U.S. Provisional Patent Application Ser. No. 60/696,318, filed Jul. 1, 2005, entitled "Large File Format Translation." The disclosure of the above-referenced patent application is hereby incorporated by reference.

BACKGROUND

1. Field of the Invention

The present invention relates generally to elementary stream file translation and, more particularly, to providing format-compliant data for a BD multiplexer used in Blu-ray Disc Authoring.

2. Related Art

Various multimedia contents including image data (e.g., movie, slide show, etc.), audio data (e.g., voice, music, etc.), game programs, and various application programs can be stored as digital data on various recording mediums, such as Blu-ray Discs (BD), Digital Versatile Discs (DVD), Mini Discs (MD), and Compact Discs (CD). In particular, BDs are discs capable of storing data in highly packed density using a blue laser, and of recording a large amount of data as high-resolution, high-quality contents. A BD can store audio-visual (AV) streams of multimedia contents such as High Definition (HD) movie contents which include high-definition moving image data as main contents. A BD can also store other data and programs, e.g., game programs, image files, audio data, and text data as subcontents. The main contents are stored as BD ROM standard data, for example, according to a BD ROM standard format. The subcontents are stored as BD ROM nonstandard data according to an arbitrary format not in accordance with a BD ROM standard format.

The MPEG-2 standards define how to format the various component parts of audio-visual (AV) streams of multimedia contents, where the most basic component part is referred to as an elementary stream. Thus, a program (e.g., a television program or a DVD track) includes a combination of elementary streams, such as video, audio, control data, and subtitles. The MPEG-2 standards also define how these elementary streams are multiplexed into a single synchronous transmission bit stream.

The MPEG-2 Transport Stream (TS) is well suited for transmission in which there may be potential packet loss or corruption by noise and/or where there is a need to send more than one program at a time. In one particular implementation, the MPEG-2 TS is used to author BDs. In another particular implementation, the MPEG-2 TS is used for a packaging process that needs modifications to the source elementary streams, which includes internet delivery as Windows Media files, Quicktime, or any other packaging format.

FIG. 1 illustrates a block diagram of a conventional MPEG-2 Transport Stream model 100. In the illustrated implementation, the model 100 receives video and audio elementary stream (ES) data. The video ES data is encoded by a video encoder 110 and the audio ES data is encoded by an audio encoder 120. The encoded video and audio ES data are packetized by packetizers 112, 114, respectively. The packetized video and audio ES data (video and audio PES) are multiplexed into a single MPEG-2 TS by a multiplexer 130.

SUMMARY

Embodiments of the present invention include providing data for a BD multiplexer without generating any additional elementary stream file. In particular, embodiments include: receiving non-format-compliant data and converting the data into format-compliant data; receiving format-compliant data and updating the data with additional information; receiving multiple format-compliant data files and combining the files into a single format-compliant file; and receiving a format-compliant data file and splitting the file into multiple files.

In one embodiment, a method for providing data for a transport multiplexer without generating any additional elementary stream file includes: receiving elementary stream data; generating pointer information for the elementary stream data; and generating a modification script using the pointer information, wherein the modification script specifies a process for modifying the elementary stream data for the transport stream multiplexer.

In another embodiment, an elementary stream service system for providing format-compliant data for a stream multiplexer without generating any additional elementary stream file comprises: a pointer information generator configured to generate pointer information for an elementary stream data; and a modification script generator configured to generate a modification script using the pointer information, wherein the modification script specifies a process for modifying the elementary stream data for the stream multiplexer.

In another embodiment, a Blu-ray Disc Authoring System comprises: a subtitle and menu authoring module; a project authoring module configured to provide scripting and multiplexing of different types of elementary stream data, wherein the scripting and multiplexing includes a process for providing data for a stream multiplexer without generating any additional elementary stream file; and a master cutting module configured to ship a cutting master to a replicator. The process comprises: receiving elementary stream data, generating a modification script, wherein the modification script specifies a process for modifying the elementary stream data for the transport stream multiplexer, and combining the different types of elementary stream data to produce the cutting master.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be understood in part by study of the accompanying drawings, in which like reference numerals refer to like parts, and in which:

FIG. 5 illustrates another example of the data translation process described above for a video ES source file;

DETAILED DESCRIPTION

As will be further described below, embodiments of the present invention satisfy a need for providing format-compliant data for a BD multiplexer without generating any additional elementary stream file. The BD multiplexer can be a transport stream multiplexer or a program stream multiplexer. In particular, embodiments include: receiving non-format-compliant data and converting the data into format-compliant data; receiving format-compliant data and updating the data with additional information; receiving multiple format-compliant data files and combining the files into a single format-compliant file; and receiving a format-compliant data file and splitting the file into multiple files.

After reading this description it will become apparent to one skilled in the art how to implement the invention in various embodiments and applications. However, although various embodiments of the present invention will be described herein, it is understood that these embodiments are presented by way of example only, and not limitation. As such, this detailed description of various embodiments should not be construed to limit the scope or breadth of the present invention as set forth in the appended claims.

Figure 1:
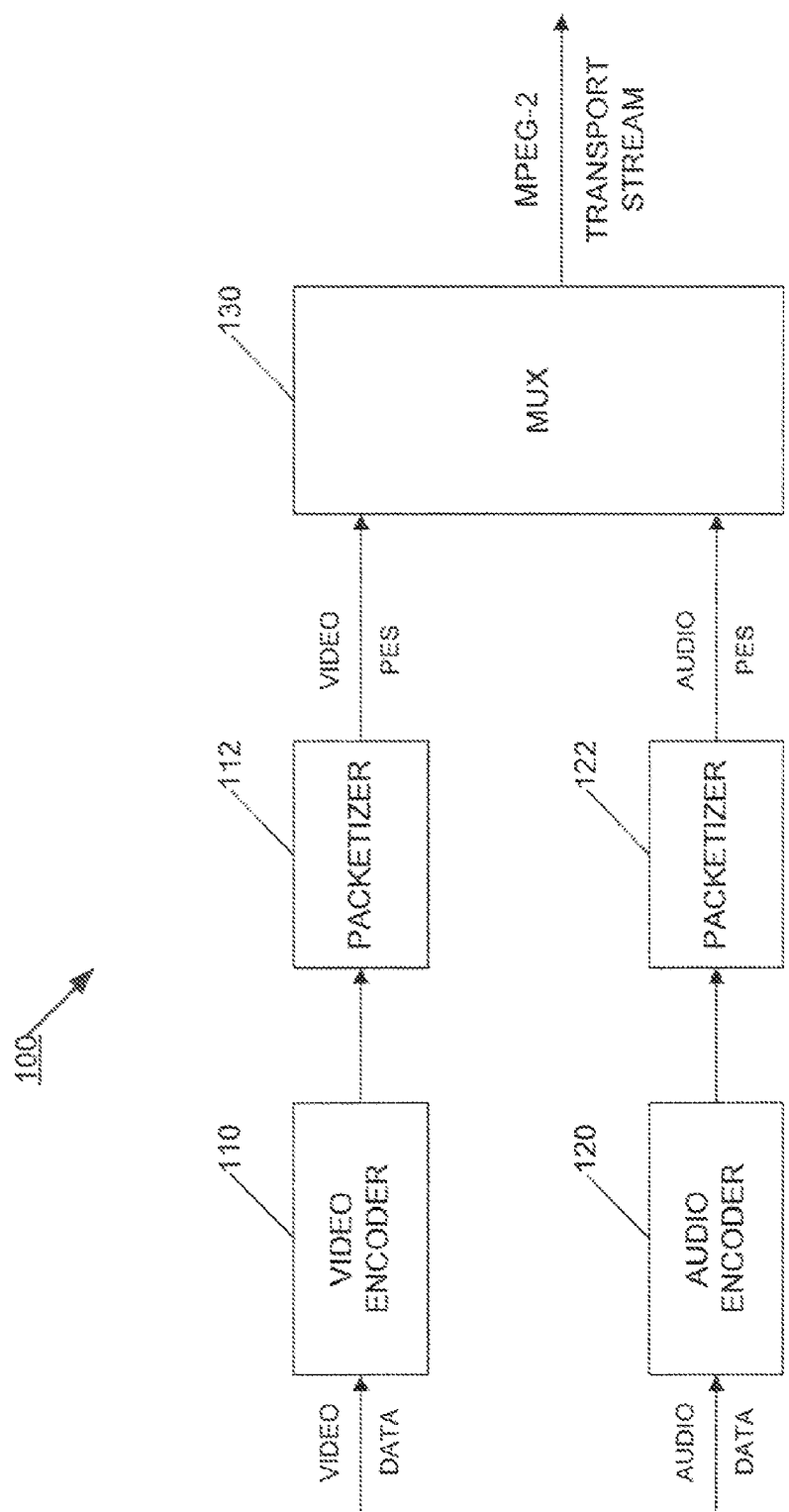
FIG. 1 illustrates a block diagram of a conventional MPEG-2 Transport Stream model.
Figure 2:
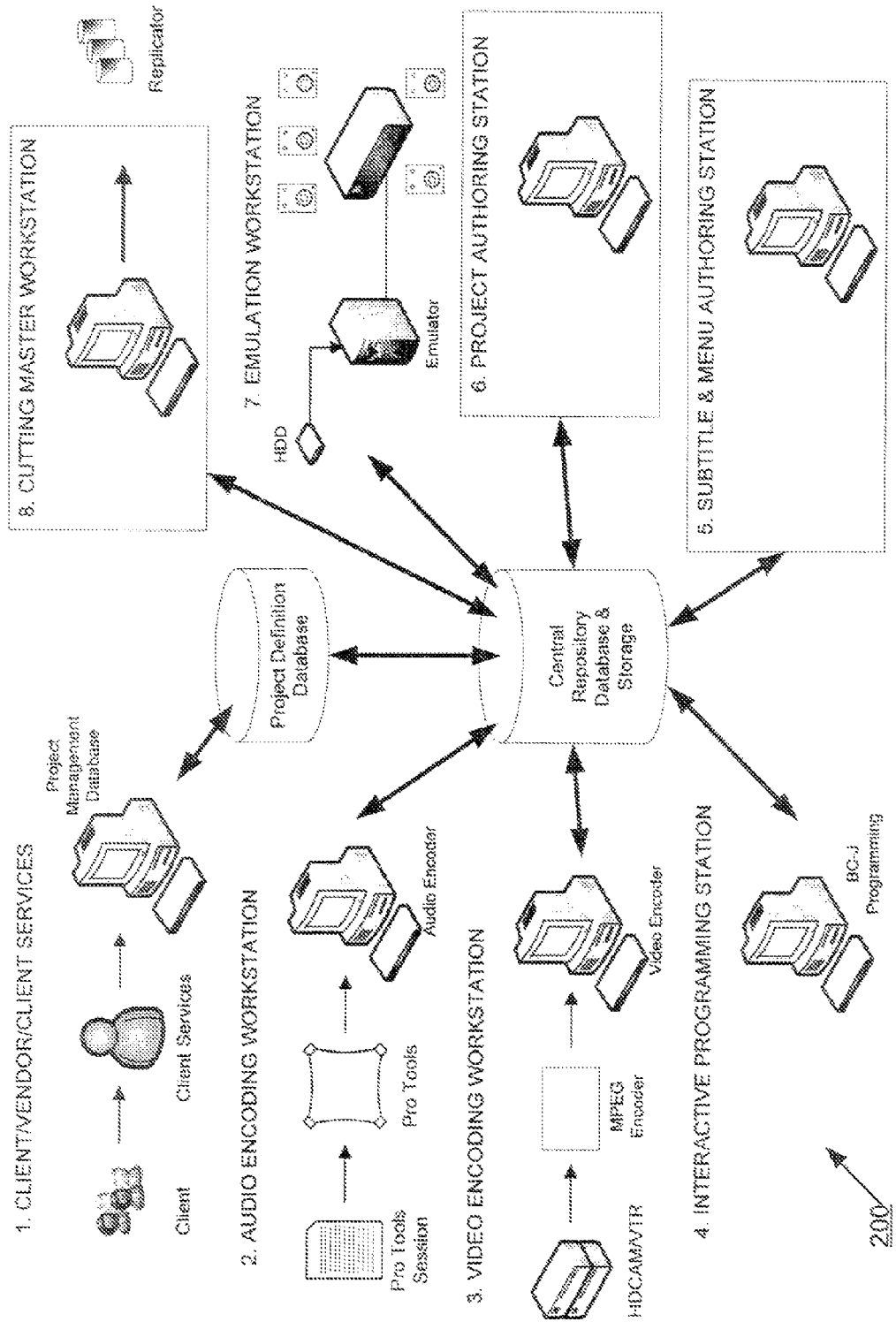
FIG. 2 illustrates one implementation of a Blu-ray Disc Authoring Environment.

FIG. 2 illustrates one implementation of a Blu-ray Disc Authoring Environment 200 which includes several steps from receiving a work order from a client to shipping a cutting master to the replicator. In the illustrated implementation, the BD Authoring Environment 200 includes following services: (1) client/vendor and/or client services; (2) audio encoding; (3) video encoding; (4) interactive programming; (5) subtitle and menu authoring; (6) project authoring; (7) emulation; and (8) master cutting. In another implementation, each step of the BD Authoring Environment 200 is configured as a service module.

For example, the client/vendor and/or client services module includes receiving a work order from a client and/or a vendor and entering the order into a project management database which interfaces with a project definition database to define a project. In the illustrated implementation, the audio encoding module is configured using Pro Tools; the video encoding module is configured using high-definition cameras, video recorders, and an MPEG encoder; and interactive programming is configured using BD-J programming. The project authoring module includes services such as project layout, navigation editing, BD scripting, simulation, multiplexing, verifying, and downloading of the elementary stream data. The master cutting module includes services such as encryption and shipping of a cutting master to the replicator for mass production of BDs. Each of modules 2 through 8 interfaces with a central repository database and storage. Other implementations may use other tools, encoders, and tasks within each step.

In one implementation, a Blu-ray Disc Authoring System (BDAS) comprises: subtitle and menu authoring (Module 5), project authoring (Module 6), and master cutting (Module 8). As described above, the project authoring includes, among other tasks, scripting, simulation, and multiplexing of four different types of elementary stream (ES) data including a video ES, an audio ES, a presentation graphics ES, and an interactive graphics ES. However, ES files at the start of the BD authoring may not be in an acceptable ES format for the BD MUX. For example, the video ES needs to have any extraneous headers removed before the data can be multiplexed. Examples of extraneous headers include Material exchange Format (MXF) header (Sony proprietary encoder header), Quicktime headers, and other related headers. Other examples of actions required to make the ES data format compliant for the BD multiplexer include, but are not limited to, the following: a video ES needs to have closed-caption (CC) data inserted; a video ES needs to have blank CC data replaced; a video ES needs to have eXtended Data Service (XDS) data inserted; a video ES needs to have extension user data deleted; an audio ES such as Advanced Codec 3 (AC-3) needs to have a timecode (TC)/header deleted.

One way to make these changes and create a BD MUX-compliant ES is to create a new ES file in the required format. Such a format-compliant file can be created at the time of media bin import or through an ES convert layer (e.g., using an ES convert module) before directing the data into the multiplexer. In cases where the ES operations have to be performed for simulation purposes, the new ES file creation must be performed at media bin import rather than at the first multiplexer.

Although this approach may reduce the time for multiplexing by transforming the ES data ahead of the multiplexer, there are some disadvantages to generating new ES files. These disadvantages include, but are not necessarily limited to: increasing the disk space required for ES storage if the original ES file needs to be maintained; having to maintain the file versions to account for re-creating a new ES if the original ES gets updated; having to generate a new ES file when the closed-caption data for emulation purposes are received and having to generate another ES when the eXtended Data Service (XDS) data arrives for final emulation purposes, if the CC data and the XDS data are coming from different vendors at different times after the encode; having to generate a new file when a change of CC data or XDS data occurs; having to maintain two ES files (one with CC data and one without CC data) when there are two versions of a project.

To accomplish the translation of ES data to provide data for a BD multiplexer without generating any additional ES file, embodiments of the present invention are configured to provide an ES service using a collection of small programs known as an intermediate dynamic link library (DLL).

Figure 3:
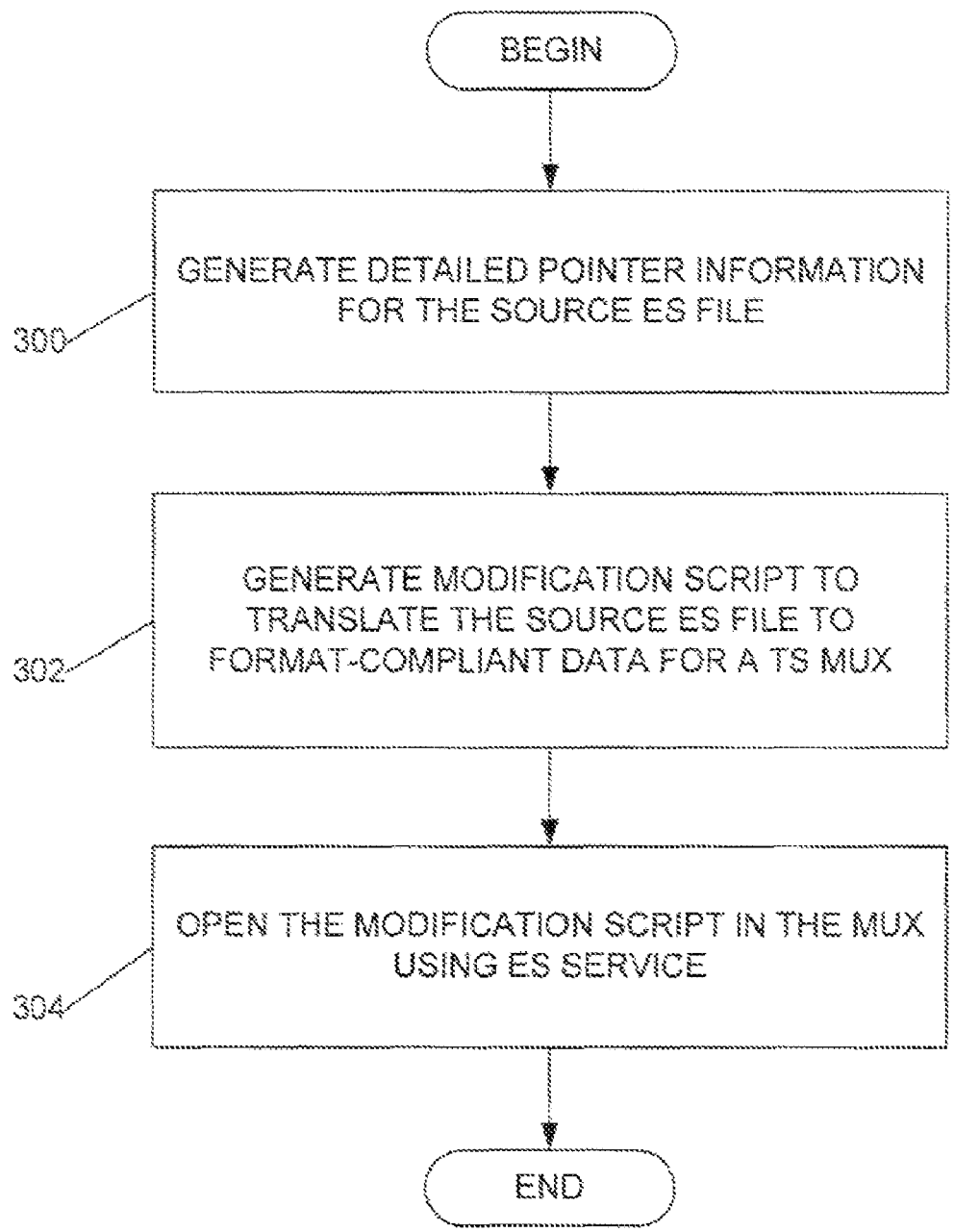
FIG. 3 is a flowchart illustrating a method for providing format-compliant data for a BD multiplexer without generating any additional ES file.

FIG. 3 is a flowchart illustrating a method for providing data for a BD multiplexer without generating any additional ES file. In the illustrated implementation, the method includes generating detailed pointer information for the source ES file, at box 300. In one implementation, generation of the detailed pointer information is accomplished by generating an extended access unit information (XUI) file that lists the size information of the data in the source ES file. In another implementation, the XUI file includes file locations or addresses within the ES to identify data in the ES (e.g., absolute addresses, rather than relative addresses, such as size).

A modification script is generated, at box 302, to translate the source ES file to format-compliant data for a BD multiplexer. In one implementation, generation of the modification script includes generating a virtual elementary stream (VES) file which specifies operational steps required for deleting non-payload data such as header data and inserting other data required for MPEG-2 Transport Stream.

At box 304, the modification script is opened in the multiplexer using the ES service. In one implementation, the modification script (e.g., the virtual ES file) is opened in the multiplexer using open function calls of the ES dynamic link library (DLL).

Figures 4A, 4B, 4C:
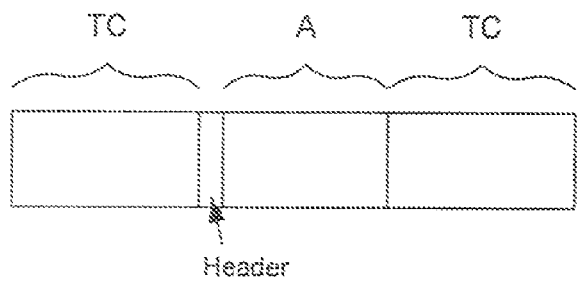
FIG. 4 illustrates one example of the data translation process described above for an audio ES source file.

FIG. 4 illustrates one example of the data translation process described above for an audio ES source file. As shown in FIG. 4A, the source file is a Dolby-compliant Advanced Codec 3 (AC-3) audio ES file named "Hello.ac3". Thus, the source audio ES file includes: 110 bytes of timecode; 10 bytes of header; 100 bytes of the audio data; and 10 bytes of timecode. FIG. 4B shows one example of a pointer information file ("Hello.ac3.ves") that lists the size information of the data in the source audio ES file as specified above. The pointer information file can be configured to include file locations or addresses within the ES to identify data in the ES (e.g., absolute addresses, rather than relative addresses, such as size).

To translate the audio ES into format-compliant data for a BD multiplexer, a modification script as shown in FIG. 4C can be generated. The script ("Hello.ac3.ves") includes the name of the source file, "hello.ac3", and steps required to perform the data translation. In this example, the script calls for deleting 10 bytes of timecode, deleting 10 bytes of header, retaining 100 bytes as source ES data, and deleting the next 10 bytes of timecode.

In one implementation, the modification script shown in FIG. 4C is generated by scanning the pointer information file shown in FIG. 4B to gather size information of the data in the source ES file; and specifying sequential steps or commands required to delete non-payload data such as header data and retain payload data, and to insert other data required for MPEG-2 Transport Stream.

FIG. 5 illustrates another example of the data translation process described above for a video ES source file. In this example, shown in FIG. 5A, a video ES file (M2V) named "title1.mxf" includes an MXF header at byte offset 0 with a byte length of 128 bytes. The video ES initially includes closed-caption (CC) data (e.g., CC-608) that needs to be replaced with newly-received CC data. Moreover, this video ES is to be used in a BD authoring project that has a requirement of no MXF data and CC-608 data received from a separate file named "title1.cc6".

Using the above-described file translation process (see FIG. 3), the video ES file is initially parsed to generate an extended access unit information (XUI) file named "title1.mxf.xui" (see FIG. 5B). This file can be generated when the video ES file is imported into the media bin or can be provided by the video encoder itself. The XUI file can be generated by performing a complete pass of the ES or by using the help of a video access unit information (AUI) file corresponding to the video ES file, if the AUI file exists. The AUI file is typically generated by the video/audio encoder. However, the file can be generated as a result of post processing after encoding by the encoder itself or by another application in the authoring process.

In this example, the XUI file includes detailed information to be used for operations that need to be performed on the ES in addition to the basic access unit information. For a video ES, examples of this information include: location information for currently-present CC-608 data in the ES; location information for CC-608 data insertion points; location information for currently-present CC-708 data in the ES; location information for CC-708 data insertion points; location information for currently-present XDS data in the ES; location information for XDS data insertion points; location information for MXF header; and location information for user data that may need to be stripped later.

Referring to FIG. 5C, a script (a VES file) is generated that will use the XUI file to dynamically change the ES file and perform the operations as required by the BD authoring project. Thus, the elementary stream does not need to be converted ahead of time but allows dynamic conversion using the script. In this example, the ES service is configured to delete existing CC-608 data and insert new CC-608 data from the file "title1.cc6". In one implementation, the script for these operations is as follows:
1) video1=videosource(title1.mxf,M2V)
2) if video1.locate(MXF)->
3) video1.delete(mxf)
4) if video1.locate(cc608)->
5) video1.delete(cc608)
6) video1.insert(cc608, title1.cc6)
7) output=video1.

Line 1 specifies the location of an ES file and identifies it as M2V data. The service stores this information in variable 'video1'. Lines 2 and 3 indicate that if MXF header data exists in the ES, then delete it. Lines 4 and 5 indicate that if CC-608 data currently exists in the ES, then delete it. Line 6 indicates that new CC-608 data is to be inserted into the ES from the file "title1.cc6" which may be located at a network location. Line 7 indicates that the output ES from this script is the modified 'video1' (i.e., original 'video1' minus MXF headers, minus original CC-608, plus new CC-608).

When the above-described script is generated and saved, the ES service generates a new access unit information file referred to as a MUX access unit information (MUI) file. For a video ES, this MUI file represents MPEG-2 frame sizes that match the output of the virtual ES file. At this point, no new ES file is generated, and the MUI file format is identical in content to the original AUI file. Thus, the multiplexer reads from the MUI file as if it was reading from an original AUI file but with its data translated to be compliant with MPEG-2 Transport Stream.

At this point, the multiplexer opens the MUI file by calling the OPEN command of the operating system (OS) and opens the VES file by calling the OPEN command of the ES service (ESS) dynamic link library (DLL). When the VES file is opened using the OS OPEN command, the operating system returns only the text of the script. However, when the file is opened using the ESS DLL, the DLL returns processed ES data. Thus, the multiplexer can request data using the READ command of the ESS DLL to receive a block of data including the modifications scripted in the VES file. Thus, by using scripts specified in the VES files, two BD authoring projects, one requiring CC-608 data and the other requiring no CC-608 data, can point to the same ES and XUI files and during runtime create different ES data. Accordingly, two MUI files are created, and each MUI file describes the result of the modifications performed as indicated in each of the VES files (i.e., one with CC-608 data and one without cc-608 data).

An ESS DLL can also be used when a dummy video ES file, which does not point to an actual ES source file, exists. In this implementation, the script commands the DLL to generate dummy MPEG-2 data when requested by the multiplexer. The DLL generates the dummy ES data (e.g., video black or audio silence) as a place holder in the absence of actual elementary stream files. This is useful for generating emulations and simulations when the project has incomplete elements. For example, during production, it is common for some elements to arrive late and prevent the project from being completed. This capability to use dummy ES data provides the authoring engineer a way to check aspects of the project that are ready without having to wait for other late elements.

Figure 6:
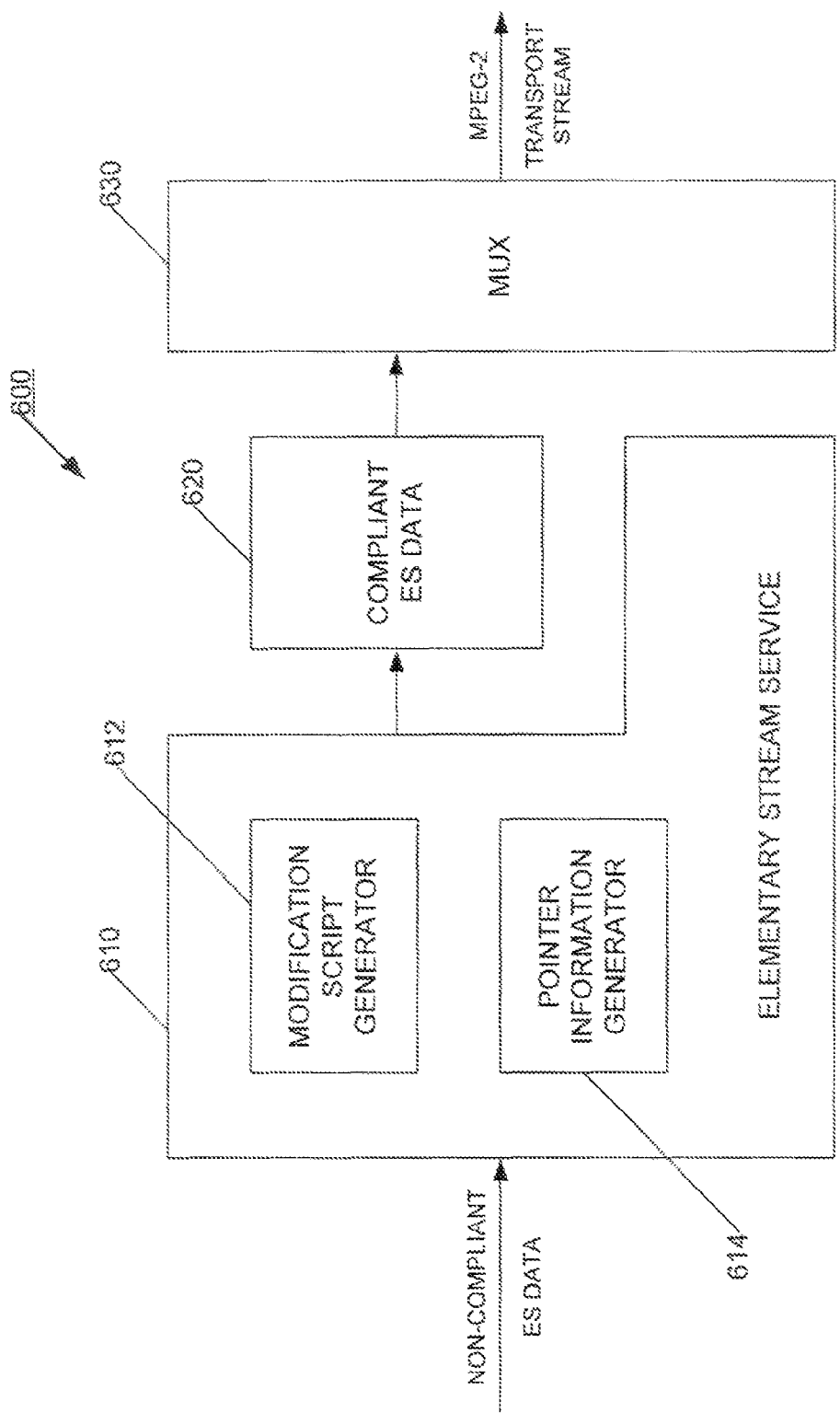
FIG. 6 is a block diagram of an elementary stream service (ESS) system for providing format-compliant data for a BD multiplexer without generating any additional elementary stream file.

FIG. 6 is a block diagram of an elementary stream service (ESS) system 600 for providing data for a BD multiplexer 630 without generating any additional elementary stream file. In the illustrated implementation, the ESS system 600 includes an elementary stream service (ESS) 610 and compliant ES data 620. The ESS 610 includes a modification script generator 612 and a pointer information generator 614. The pointer information generator 614 is configured to generate pointer information for elementary stream data.

In one implementation, the modification script generator 612 is configured to generate a modification script using the pointer information. In this implementation, the modification script specifies a process for receiving non-format-compliant data and converting the data into format-compliant data for the BD multiplexer 630.

In another implementation, the modification script generator 612 receives format-compliant elementary stream data and dynamically updates the received stream data with additional information (e.g., closed-caption (CC) data or eXtended Data Service (XDS) data) specified in the modification script. In one particular embodiment, the additional information added to the stream data includes watermarks in the video and audio. Thus, before the data is passed on to the multiplexer, the video or audio is modified to insert a visible or invisible watermark to avoid creating a separate watermarked file.

In another implementation, the modification script generator 612 receives format-compliant elementary stream data and dynamically updates the received stream data by removing information (e.g., CC data or XDS data) specified in the modification script from the received stream data.

In another implementation, the modification script generator 612 receives multiple format-compliant elementary stream data files and combines the received stream data files into a single format-compliant file. In a further implementation, the modification script generator 612 receives a format-compliant elementary stream data file and splits the received stream data file into multiple format-compliant files.

In general, the authoring application user interface (UI) offers several mechanisms to indicate what kind of operations need to be performed on the elementary stream. The collective set of these operations are fed into the modification script generator 612 to come up with one comprehensive script representing all the modifications required for that file. The UI offers properties of the file that can be modified, and offers a timeline where trimming and joining can be specified. Some modifications are automatically identified by the authoring system. Items that are making the original file non-compliant are automatically identified and their modification scripts are automatically generated without user input. The system ensures that a non-compliant file is always made compliant before being passed to the multiplexer. If the system cannot identify the data making the file non-compliant it rejects the file as a non-compliant that cannot be automatically processed by the system.

Figure 7A:
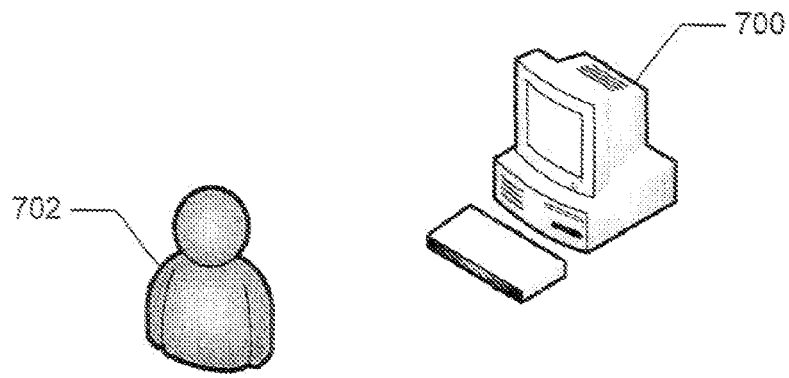
FIG. 7A shows a representation of a computer system and a user.

FIG. 7A shows a representation of a computer system 700 and a user 702. The user 702 can use the computer system 700 to provide data for a BD multiplexer without generating any additional elementary stream file. The computer system 700 generates pointer information for a source ES file and generates a modification script to modify the source ES file for the BD multiplexer.

Figure 7B:
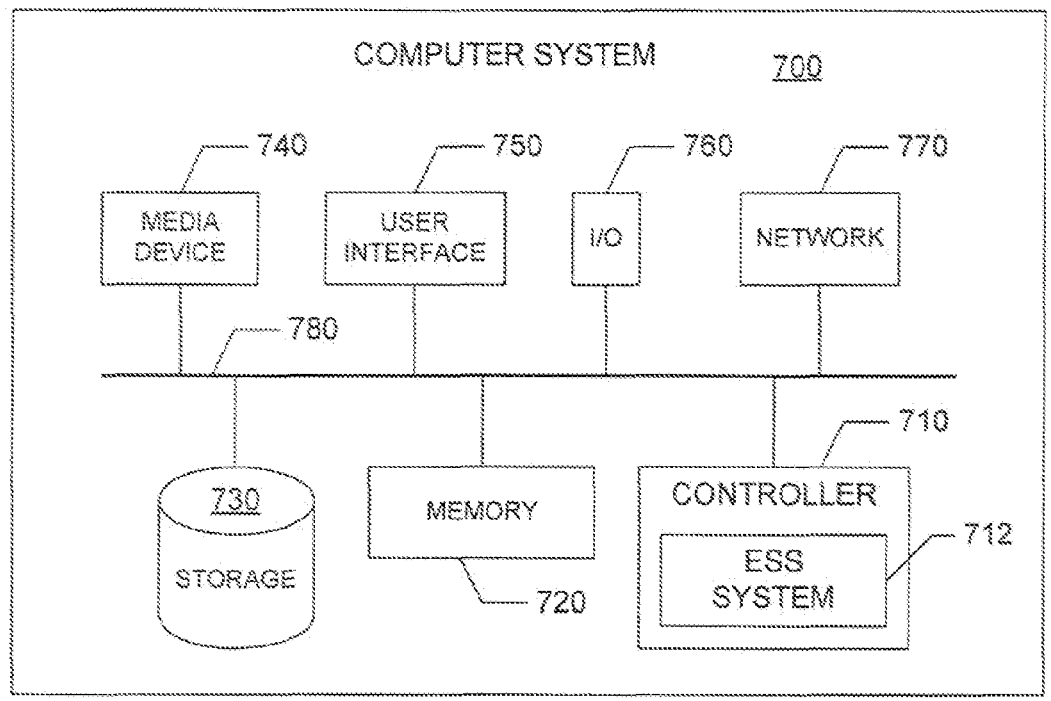
FIG. 7B shows a block diagram of one implementation of the computer system in FIG. 7A, including an Blu-ray Disc Authoring System (BDAS).

FIG. 7B shows a block diagram of one implementation of the computer system 700 in FIG. 7A, including an elementary stream service system 712. The computer system 700 includes a controller 710, a memory 720, storage 730, a media device 740, a participant interface 750, an input/output (I/O) interface 760, and a network interface 770. These components are interconnected by a common bus 780. Alternatively, different connection configurations can be used, such as a star pattern with the controller at the center.

The controller 710 is a programmable processor and controls the operation of the computer system 700 and its components. The controller 710 loads instructions from the memory 720 or an embedded controller memory (not shown) and executes these instructions to control the system. In its execution, the controller 710 provides the elementary stream service system 712 as a software system. Alternatively, this service can be implemented as separate components in the controller 710 or the computer system 700.

Memory 720 stores data temporarily for use by the other components of the computer system 700. In one implementation, memory 720 is implemented as RAM. In one implementation, memory 720 also includes long-term or permanent memory, such as flash memory and/or ROM.

Storage 730 stores data temporarily or long term for use by other components of the computer system 700, such as for storing data used by the elementary stream service system 712. In one implementation, storage 730 is a hard disk drive.

The media device 740 receives removable media and reads and/or writes data to the inserted media. In one implementation, the media device 740 is an optical disc drive.

The user interface 750 includes components for accepting user input from the user of the computer system 700 and presenting information to the user. In one implementation, the user interface 750 includes a keyboard, a mouse, audio speakers, and a display. The controller 710 uses input from the user to adjust the operation of the computer system 700.

The I/O interface 760 includes one or more I/O ports to connect to corresponding I/O devices, such as external storage or supplemental devices (e.g., a printer or a PDA). In one implementation, the ports of the I/O interface 760 include ports such as: USB ports, PCMCIA ports, serial ports, and/or parallel ports. In another implementation, the I/O interface 760 includes a wireless interface for communication with external devices wirelessly.

The network interface 770 includes a wired and/or wireless network connection, such as an RJ-45 or "Wi-Fi" interface (802.11) supporting an Ethernet connection.

The computer system 700 includes additional hardware and software typical of computer systems (e.g., power, cooling, operating system), though these components are not specifically shown in FIG. 7B for simplicity. In other implementations, different configurations of the computer system can be used (e.g., different bus or storage configurations or a multi-processor configuration).

Various illustrative embodiments of the present invention have been described. However, one of ordinary skill in the art will recognize that additional embodiments are also possible and within the scope of the present invention. For example, although the data translation examples describe only audio and video ES, the data translation process can be used to translate other ES source files including graphics ES and presentation ES. Similarly, while the examples above discuss the BD format, these techniques could be applied to other formats in different implementations.

Accordingly, the present invention is not limited to only those embodiments described above.

What is claimed is:

1. A method for providing data for a transport stream multiplexer without generating any-additional elementary stream file, the method comprising:
   receiving elementary stream data;
   generating pointer information that lists size information of the elementary stream data;
   generating a modification script that specifies operational steps for deleting non- payload data from and inserting other data required of a transport stream to the generated pointer information; and modifying the elementary stream data using the modification script on the pointer information for the transport stream multiplexer.

2. The method of claim 1, wherein said modifying the elementary stream data includes converting the elementary stream data to format compliant data for the transport stream multiplexer.

3. The method of claim 1, wherein said generating pointer information includes
generating an extended access unit information file that lists the size information of the elementary stream data, wherein the extended access unit information file includes file locations or addresses within an elementary stream to identify the elementary stream data.

4. The method of claim 2, wherein said modifying the elementary stream data includes
dynamically updating said format-compliant elementary stream data with additional information specified in said modification script.

5. The method of claim 4, wherein said additional information includes watermarks in video and audio elementary stream data.

6. The method of claim 3, wherein said modifying said elementary stream data includes
dynamically updating said format-compliant elementary stream data by removing information specified in said modification script from said format-compliant elementary stream data.

7. The method of claim 1, wherein said receiving elementary stream data includes
receiving multiple format-compliant data files.

8. The method of claim 7, wherein said modifying said elementary stream data includes combining said multiple format-compliant data files into a single format-compliant file.

9. The method of claim 1, wherein said receiving elementary stream data includes
receiving a format-compliant data file.

10. The method of claim 9, wherein said modifying said elementary stream data includes
splitting said format-compliant data file into multiple data files.

11. The method of claim 1, wherein said generating a modification script includes generating a virtual elementary stream file.

12. The method of claim 11, further comprising generating an access unit information file representing MPEG-2 frame sizes that match the output of the virtual elementary stream file.

13. The method of claim 1, further comprising
opening the modification script in the transport stream multiplexer by calling an OPEN command of an operating system.

14. The method of claim 1, further comprising
opening the modification script in the transport stream multiplexer using open function calls of a dynamic link library of an elementary stream service.

15. The method of claim 1, further comprising
combining said elementary stream data into an MPEG-2 Transport Stream.

16. The method of claim 1, wherein said elementary stream data includes Blu-ray disc ROM standard format data suitable for authoring a Blu-ray disc.

17. The method of claim 1, wherein said elementary stream data includes an audio elementary stream (ES), a video ES, a presentation graphics ES, and an interactive graphics ES.

18. The method of claim 12, further comprising
opening the access unit information file by calling the open command of an operating system.

19. The method of claim 18, further comprising opening the virtual elementary stream file using the open command of a dynamic link library of an elementary stream service.

20. The method of claim 19, further comprising
requesting data from the transport stream multiplexer using the read command of the dynamic link library of the elementary stream service to receive a block of data including modifications scripted in the virtual elementary stream file.

21. An elementary stream service system for providing format-compliant data for a stream multiplexer without generating any additional elementary stream file, the system comprising:
a pointer information generator configured to generate pointer information for an elementary stream data that lists size information of the elementary stream data; and
a modification script generator configured to generate a modification script that specifies operational steps for deleting non-payload data from and inserting other data required of a transport stream to the generated pointer information, and
modifying said elementary stream data using the modification script on the pointer information for the stream multiplexer.

22. The elementary stream service system of claim 21, wherein the stream multiplexer is a program stream multiplexer.

23. The elementary stream service system of claim 21, wherein said elementary stream data includes audio and video elementary stream data.

24. The elementary stream service system of claim 21, further comprising
a converter configured to convert said elementary stream data to format compliant data for a stream multiplexer.

25. The elementary stream service system of claim 21, wherein
a pointer information generator generates an extended access unit information file that lists the size information of the elementary stream data,
wherein the extended access unit information file includes file locations or addresses within an elementary stream to identify the elementary stream data.

26. The elementary stream service system of claim 21, wherein said elementary stream data includes Blu-ray disc ROM standard format data.

27. The elementary stream of service system of claim 26, wherein said elementary stream data includes an audio elementary stream (ES), a video ES, a presentation graphics ES, and an interactive graphics ES.

28. The elementary stream service system of claim 21, wherein said elementary stream data includes header data.

29. The elementary stream service system of claim 28, wherein said pointer information generator includes
an identifier configured to identify address information of said header data.

30. The elementary stream service system of claim 21, further comprising
an access unit information file representing MPEG-2 frame sizes that match the output of a virtual elementary stream file in the modification script.

31. An apparatus for providing format-compliant data for a transport stream multiplexer without generating any additional elementary stream file, the apparatus comprising:

means for receiving elementary stream data;

means for generating pointer information that lists size information of said elementary stream data;

means for generating a modification script that specifies operational steps for deleting non-payload data from and inserting other data required of a transport stream to the generated pointer information; and means for modifying elementary stream data using the modification script on the pointer information for a transport stream multiplexer.

32. A Blu-ray Disc Authoring System comprising:

a subtitle and menu authoring module;

a project authoring module configured to provide scripting and multiplexing of different types of elementary stream data, wherein said scripting and multiplexing includes a process for providing data for a stream multiplexer without generating any additional elementary stream file, the process comprising:

receiving elementary stream data, generating pointer information that lists size information of the elementary stream data, generating a modification script that specifies operational steps for deleting non-payload data from and inserting other data required of a transport stream to the generated pointer information, modifying said elementary stream data using the modification script on the pointer information for the transport stream multiplexer, and combining said different types of elementary stream data to produce a cutting master; and a master cutting module configured to ship the cutting master to a replicator.

* * * * *